(12) United States Patent
Simonneau et al.

(10) Patent No.: US 8,848,284 B2
(45) Date of Patent: Sep. 30, 2014

(54) BIDIRECTIONAL OPTICAL AMPLIFIER

(75) Inventors: Christian Simonneau, Nozay (FR);
Dominique Chiaroni, Nozay (FR);
Gema Buforn Santamaria, Nozay (FR);
Sophie Etienne, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 185 days.

(21) Appl. No.: 13/513,957

(22) PCT Filed: Dec. 10, 2010

(86) PCT No.: PCT/EP2010/069402
§ 371 (c)(1),
(2), (4) Date: Nov. 13, 2012

(87) PCT Pub. No.: WO2011/070163
PCT Pub. Date: Jun. 16, 2011

(65) Prior Publication Data
US 2013/0057948 A1 Mar. 7, 2013

(30) Foreign Application Priority Data
Dec. 11, 2009 (EP) ..................... 09306219

(51) Int. Cl.
*H01S 3/02* (2006.01)
(52) U.S. Cl.
USPC ......................... 359/341.2; 398/67
(58) Field of Classification Search
USPC ......................... 359/341.2; 398/67
See application file for complete search history.

(56) References Cited

U.S. PATENT DOCUMENTS 5,280,549 A * 1/1994 Barnard et al. ................. 385/15
6,392,790 B1 5/2002 Lauder et al.
(Continued)

FOREIGN PATENT DOCUMENTS

EP 1022871 A1 7/2000
WO WO-2009055984 A1 5/2009

OTHER PUBLICATIONS

International Search Report, Jan. 2011.
Written Opinion of Search Authority, Jan. 2011.

*Primary Examiner* — Mark Hellner
(74) *Attorney, Agent, or Firm* — Harness, Dickey & Pierce

(57) ABSTRACT

A bidirectional optical amplifier (1) is arranged to be passed through in one direction by a downstream optical signal (SDS) and in an opposite direction by an upstream optical signal (SUS), and comprises: a first optical circulator (2) having three ports, a first port of the first optical circulator defining a first connector (8) at one end of the bidirectional optical amplifier, a second optical circulator (3) having three ports, a first port of the second optical circulator defining a second connector (9) at an opposite end of the bidirectional optical amplifier, a downstream unidirectional optical amplifier (4) connected between a second port of the first optical circulator and a second port of the second optical circulator so as to define a downstream amplification path (5) for the downstream optical signal, and an upstream unidirectional optical amplifier (6) connected between a third port of the first optical circulator and a third port of the second optical circulator so as to define an upstream amplification path (7) for the upstream optical signal. The bidirectional optical amplifier (1) further comprises a waveband separator (10) connected between the second port of the first optical circulator (2) and an input of the downstream unidirectional optical amplifier (4).

9 Claims, 3 Drawing Sheets

(56) References Cited

U.S. PATENT DOCUMENTS

| | | | |
|---|---|---|---|
| 6,697,575 B1* | 2/2004 | Liang et al. | 398/104 |
| 2001/0019449 A1* | 9/2001 | Krummrich | 359/341.2 |
| 2002/0093708 A1* | 7/2002 | Johlen | 359/124 |
| 2002/0118446 A1* | 8/2002 | Lee et al. | 359/341.2 |
| 2009/0103922 A1* | 4/2009 | Lee et al. | 398/72 |

* cited by examiner

BIDIRECTIONAL OPTICAL AMPLIFIER

FIELD OF THE INVENTION

An aspect of the invention relates to a bidirectional optical amplifier. The bidirectional optical amplifier may be used in an optical communication network using optical fibers. As an example, the optical communication network may be a passive optical network PON, more particularly a hybrid wavelength division multiplexed and time division multiplexed passive optical network WDM-TDM PON.

BACKGROUND OF THE INVENTION

In the following, the terminologies "connected" and "connection" is intended to mean "optically connected" and "optical connection", respectively.

FIG. 1 is a block diagram illustrating a passive optical network WDM-TDM PON. A passive optical network PON has a point-to-multipoint network architecture. It comprises an optical line terminal OLT 20 connected to a plurality of optical network units ONU 30 through a plurality of optical splitters or multiplexers 31 and optical fiber portions 22, 32. Typically, the optical line terminal 20 comprises a receiver 23 and a transmitter 24 located at a central office of a service provider, and serves the plurality of optical network units 30 located near end users. The receiver 23 and the transmitter 24 are connected to the optical fiber portion 22 through a circulator 21. The transmitter 24 of the optical line terminal 20 transmits optical signals towards the optical network units 30. The receiver 23 of the optical line terminal 20 receives optical signals sent by the optical network units 30. These downstream and upstream signals using different wavelength bands share the same optical fiber portions 22, 32. Generally, due to the attenuation of the optical signals travelling in long optical fiber portions, the passive optical network PON further comprises a bidirectional optical amplifier 1.

FIG. 2 is a block diagram illustrating the bidirectional optical amplifier 1. The bidirectional optical amplifier 1 is passed through in one direction by a downstream optical signal $S_{DS}$ and in an opposite direction by an upstream optical signal $S_{US}$. It comprises a first optical circulator 2 and a second optical circulator 3, both having three ports P1, P2, P3. A first port P1 of the first optical circulator 2 defines a first connector 8 at one end of the bidirectional optical amplifier. A first port P1 of the second optical circulator 3 defines a second connector 9 at an opposite end of the bidirectional optical amplifier. The first connector 8 is connected to an optical fiber portion 32. The second connector 9 is connected to another optical fiber portion 22. A downstream amplification path 5 for the downstream optical signal $S_{DS}$ is defined between a second port P2 of the first optical circulator 2 and a second port P2 of the second optical circulator 3. A downstream unidirectional optical amplifier 4 is connected between said ports in the downstream amplification path 5. An upstream amplification path 7 for the upstream optical signal $S_{US}$ is defined between a third port P3 of the first optical circulator 2 and a third port P3 of the second optical circulator 3. An upstream unidirectional optical amplifier 6 is connected between said ports in the upstream amplification path 7 for the upstream optical signal. Typically, such a bidirectional optical amplifier comprises rare earth doped fiber amplifiers DFA as unidirectional optical amplifiers 4, 6. A rare earth doped fiber amplifier comprises a rare earth doped optical fiber as a gain medium to amplify the optical signal. As an example, the rare earth doped fiber amplifier may be an Erbium doped fiber amplifier EDFA.

The bidirectional optical amplifier 1 as depicted in FIG. 2 is not satisfactory because of instability caused by the imperfect isolation between the second P2 and third P3 port of each optical circulator. The effects of imperfect isolation on the downstream signal $S_{DS}$ (full line arrows) and the upstream signal $S_{US}$ (broken line arrows) at the different amplification stages are depicted in small frames. More precisely, a part of the output power 11 of the upstream unidirectional optical amplifier 6 is re-injected at the input of the downstream unidirectional optical amplifier 4. Similarly, a part of the output power 12 of the downstream unidirectional optical amplifier 4 is re-injected at the input of the upstream unidirectional optical amplifier 6. The corresponding optical power re-circulates in a closed loop in the bidirectional optical amplifier 1. As a consequence, such a bidirectional optical amplifier 1 is not stable, namely the output power of the bidirectional optical amplifier in both directions varies erratically over the time.

It has been proposed bidirectional optical amplifiers comprising unidirectional optical amplifiers having low output power, or comprising circulators having increased isolation ratio. However, these solutions do not satisfactorily prevent oscillation of the bidirectional optical amplifier output signal. Further, a circulator having an isolation ratio of 35 dB requires the output power of the unidirectional optical amplifiers to be limited to 16 dBm in order to prevent oscillation. This is not acceptable because it reduces the reach (distance between OLT and ONU) and splitting ratio (number of ONU per OLT) of the passive optical network.

SUMMARY OF THE INVENTION

It is an object of the invention to propose a bidirectional optical amplifier that overcomes one or more of the limitations of the existing bidirectional optical amplifier.

According to one aspect of the invention, there is provided a bidirectional optical amplifier arranged to be passed through in one direction by a downstream optical signal and in an opposite direction by an upstream optical signal, comprising:
- a first optical circulator having three ports,
- a second optical circulator having three ports,
- a downstream unidirectional optical amplifier connected between a second port of the first optical circulator and a second port of the second optical circulator so as to define a downstream amplification path for the downstream optical signal,
- an upstream unidirectional optical amplifier connected between a third port of the first optical circulator and a third port of the second optical circulator so as to define an upstream amplification path for the upstream optical signal, and
- a waveband separator connected between the second port of the first optical circulator and an input of the downstream unidirectional optical amplifier.

The waveband separator may be waveband splitter or a de-interleaver.

The unidirectional optical amplifier may be a rare earth doped fiber amplifier or a semiconductor optical amplifier or a lumped Raman amplifier.

The downstream optical signal may transport continuous traffic. The upstream optical signal may transport burst traffic.

According to another aspect of the invention, there is provided a passive optical network comprising an optical line terminal connected to a plurality of optical network units through a plurality of optical splitters or multiplexers and optical fiber portions. The passive optical network further comprises a bidirectional optical amplifier of the invention.

The bidirectional optical amplifier of the invention offers greater stability even with high output power and over a wide range of operating conditions. Further, the bidirectional optical amplifier, in particular the upstream unidirectional amplifier has improved burst mode capability, upstream signal being efficiently amplified in the burst mode of operation. Other advantages will become apparent from the hereinafter description of the invention.

BRIEF DESCRIPTION OF THE DRAWINGS

The present invention is illustrated by way of examples and not limited to the accompanying drawings, in which like references indicate similar elements.

DETAILED DESCRIPTION OF THE INVENTION

Figure 1:
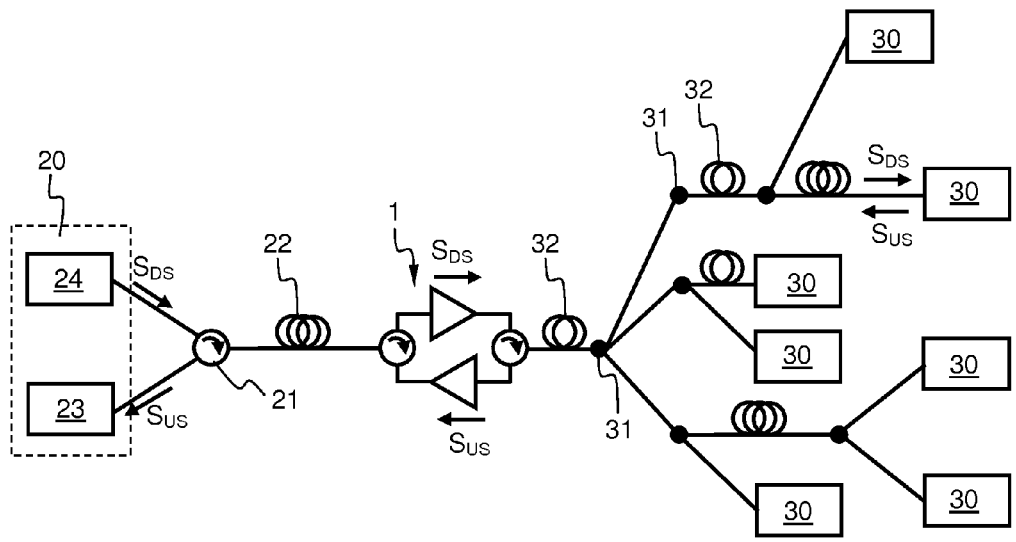
FIG. 1 is a block diagram illustrating a passive optical network WDM-TDM PON.
Figure 2:
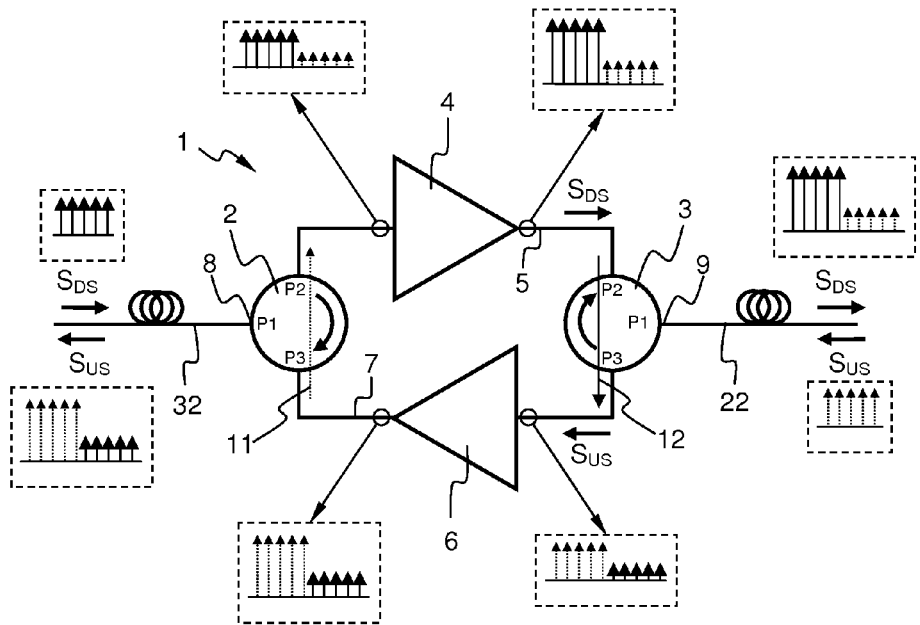
FIG. 2 is a block diagram illustrating a bidirectional optical amplifier according to the prior art.
Figure 3:
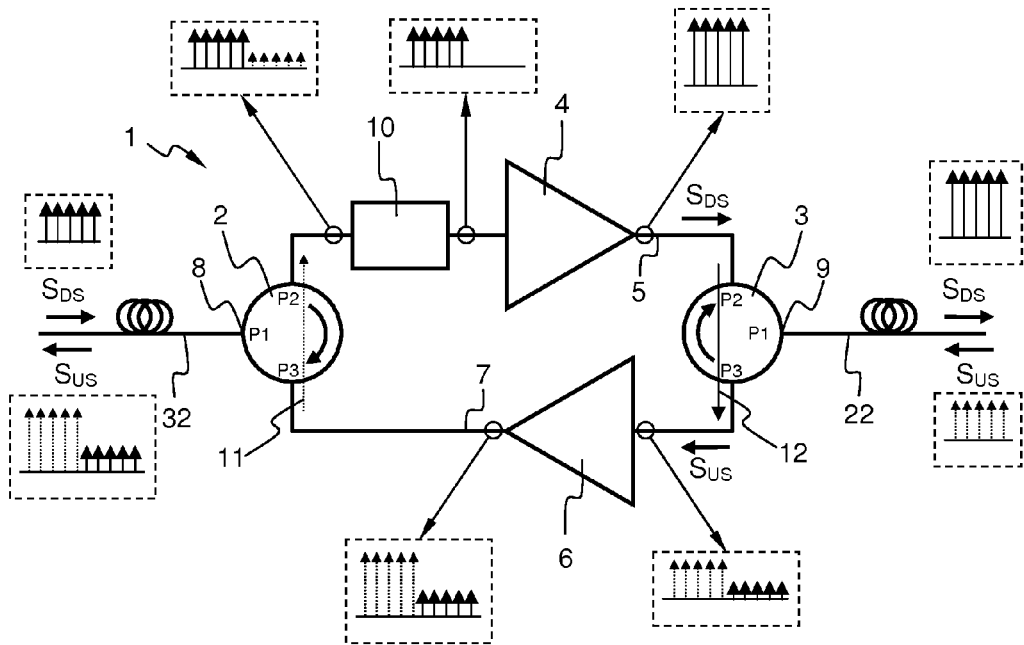
FIG. 3 is a block diagram illustrating a bidirectional optical amplifier according to the invention.

FIG. 3 is a block diagram illustrating a bidirectional optical amplifier of the invention. The bidirectional optical amplifier 1 comprises a first optical circulator 2 and a second optical circulator 3, a downstream unidirectional optical amplifier 4, an upstream unidirectional optical amplifier 6 and a waveband separator 10. The waveband separator 10 is connected between the second port P2 of the first optical circulator 2 and the input of the downstream unidirectional optical amplifier 4. The unidirectional optical amplifiers 4, 6 may be Erbium doped fiber amplifier EDFA. Alternatively, it may also be any rare earth doped fiber amplifier (e.g. rare earth being thulium, praseodymium, etc. . . . ), or a lumped Raman amplifier, or a semiconductor optical amplifier SOA.

The bidirectional optical amplifier 1 may be connected to the optical fiber portion 32 by a first connector 8 defined by the first port P1 of the first optical circulator 2 at one end of the bidirectional optical amplifier. The bidirectional optical amplifier 1 may be further connected to the optical fiber portion 22 by a second connector 9 defined by the first port P1 of the second optical circulator 3 at an opposite end of the bidirectional optical amplifier.

The path between the second port P2 of the first optical circulator 2, the waveband separator 10, the downstream unidirectional optical amplifier 4 and the second port P2 of the second optical circulator 3 defines a downstream amplification path 5 for amplifying the downstream optical signal $S_{DS}$. Typically, the downstream optical signal $S_{DS}$ transports continuous traffic.

The path between the third port P3 of the second optical circulator 3, the upstream unidirectional optical amplifier 6 and the third port P3 of the first optical circulator 2 defines an upstream amplification path 7 for amplifying the upstream optical signal $S_{DS}$. Typically, the upstream optical signal $S_{US}$ transports burst traffic.

Due to the imperfect isolation of the first circulator 2, a part of the output power 11 of the upstream unidirectional optical amplifier 6 is re-injected in the downstream amplification path 5. The effects of amplification and recirculation on the downstream signal $S_{DS}$ (full line arrows) and the upstream signal $S_{US}$ (broken line arrows) at the different amplification stages are depicted in small frames. The waveband separator 10 prevents the part of the output power 11 from reaching the input of the downstream unidirectional optical amplifier 4. Thus, it prevents the optical power from re-circulating in the downstream amplification path 5. The waveband separator 10 is designed such as to take into consideration the different wavelength bands used for the downstream optical signal $S_{DS}$ transporting continuous traffic and the upstream optical signal $S_{US}$ transporting burst traffic. Advantageously, the waveband separator 10 rejects the totality of the wavelength band corresponding to the upstream optical signal $S_{US}$. As a consequence, the downstream unidirectional optical amplifier 4 only amplifies the downstream optical signal $S_{DS}$. The output power of the downstream unidirectional optical amplifier 4 and, thus, of the bidirectional optical amplifier at connector 9 becomes stable over the time.

Advantageously, the upstream amplification path 7 does not comprise any waveband separator. Due to the imperfect isolation of the second circulator 3, a part of the output power 12 of the downstream unidirectional optical amplifier 4 is re-injected in the upstream amplification path 7. As a consequence, the upstream amplification path 7 and in particular the upstream unidirectional optical amplifier 6 is always loaded with a continuous optical signal. Due to the nature of the upstream optical signal $S_{US}$ that transports burst traffic, this enables maintaining the upstream unidirectional optical amplifier 6 loaded and thus reducing the power variation at the input of the upstream unidirectional optical amplifier 6 due to the burst traffic.

There are various ways of implementing a waveband separator 10 that efficiently prevents the optical power of the upstream optical signal $S_{US}$ from re-circulating in the downstream amplification path 5. The waveband separator is chosen with respect of the wavelength allocation plan of the passive optical network WDM-TDM PON.

Figure 4:
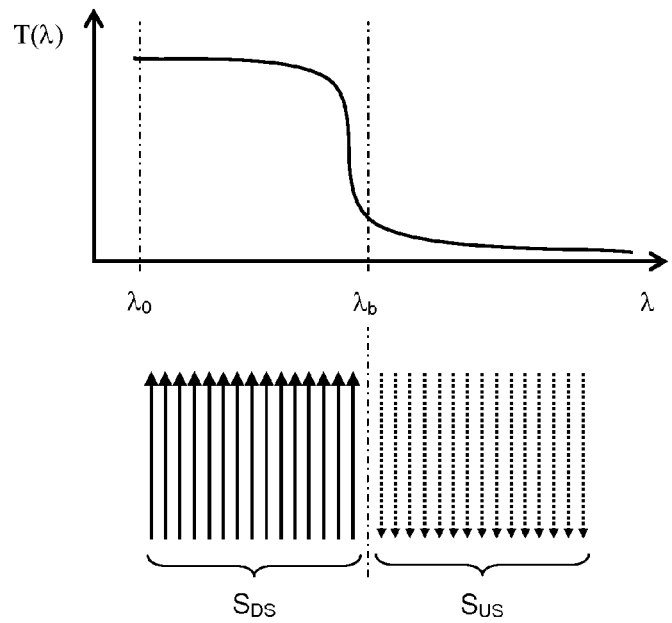
FIGS. 4 and 5 show examples of a waveband separator implementation used in the bidirectional optical amplifier of the invention.

FIG. 4 illustrates an example of waveband separator implementation. The waveband separator 10 is a waveband splitter. In the present example, the downstream optical signal $S_{DS}$ is comprised in a wavelength band $[\lambda_0; \lambda_b]$, while the upstream optical signal $S_{US}$ is above the wavelength $\lambda_b$. The transmission T as a function of the wavelength $\lambda$ of the waveband splitter is such that only the optical signals having a wavelength comprised in said band $[\lambda_0; \lambda_b]$ are totally or at least partially transmitted.

Figure 5:
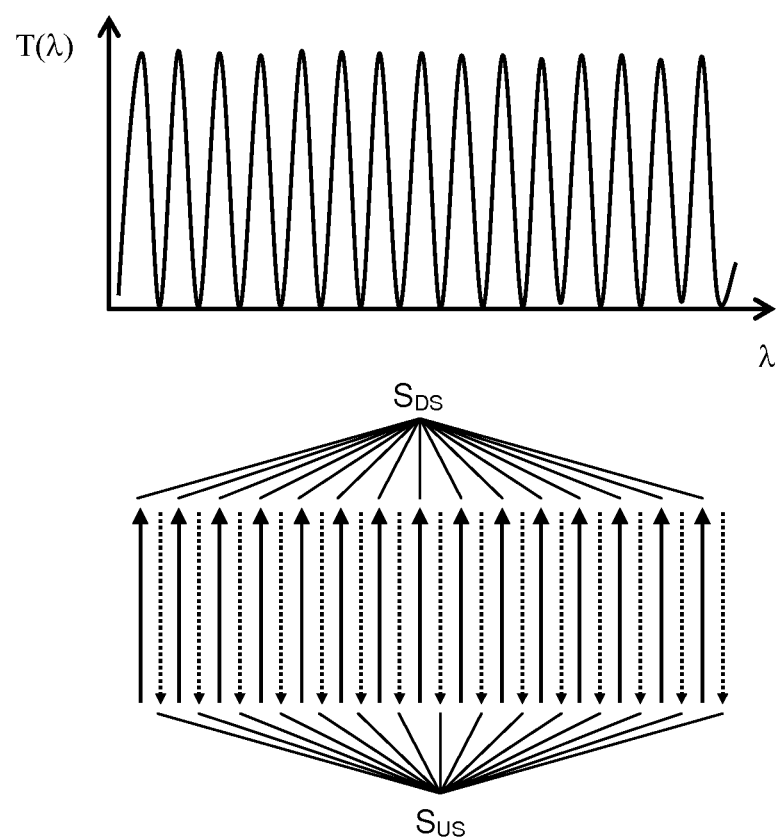

FIG. 5 illustrates another example of waveband separator implementation. The waveband separator 10 is a de-interleaver. In the present example, the downstream optical signal $S_{DS}$ is imbricated in the upstream optical signal $S_{US}$. The de-interleaver is a passive fiber-optic device having one input port and two output ports. The de-interleaver is used to separates the imbricated signal into odd channels (first output port) and even channels (second output port). The input of the de-interleaver is connected to the second port P2 of the first circulator 2. The first output port is connected to the input of the downstream unidirectional optical amplifier 4. The second output port (not shown) is not connected, for example it may stay in the air. The transmission T as a function of the wavelength $\lambda$ of the de-interleaver is such that only the downstream optical signal $S_{DS}$ delivered by the corresponding output port is injected into the downstream unidirectional optical amplifier 4.

The bidirectional optical amplifier of the invention may be applied in various passive optical network PON, for example asynchronous transfer mode ATM passive optical network APON, broadband passive optical network BPON, Ethernet passive optical network EPON or GEPON, Gigabit passive optical network GPON, 10 Gigabit Ethernet passive optical network 10G-EPON.

The drawings and their description hereinbefore illustrate rather than limit the invention.

Although a drawing shows different functional entities as different blocks, this by no means excludes implementations in which a single entity carries out several functions, or in which several entities carry out a single function. In this respect, the drawings are very diagrammatic.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A bidirectional optical amplifier arranged to be passed through in one direction by a downstream optical signal and in an opposite direction by an upstream optical signal, comprising:
    a first optical circulator having three ports,
    a second optical circulator having three ports,
    a downstream unidirectional optical amplifier connected between a second port of the first optical circulator and a second port of the second optical circulator so as to define a downstream amplification path for the downstream optical signal, and
    an upstream unidirectional optical amplifier connected between a third port of the first optical circulator and a third port of the second optical circulator so as to define an upstream amplification path for the upstream optical signal,
    wherein the bidirectional optical amplifier further comprises a waveband separator to reject the wavelength component of the upstream optical signal, the waveband separator only being disposed in the downstream amplification path, the waveband separator being connected between the second port of the first optical circulator and an input of the downstream unidirectional optical amplifier.

2. The bidirectional optical amplifier of claim 1, wherein the waveband separator is a waveband splitter.

3. The bidirectional optical amplifier of claim 1, wherein the waveband separator is a de-interleaver.

4. The bidirectional optical amplifier according to claim 1, wherein any of the unidirectional optical amplifier is an rare earth doped fiber amplifier.

5. The bidirectional optical amplifier according to claim 1, wherein any of the unidirectional optical amplifier is a semiconductor optical amplifier.

6. The bidirectional optical amplifier according to claim 1, wherein any of the unidirectional optical amplifier is a lumped Raman amplifier.

7. The bidirectional optical amplifier according to claim 1, wherein the downstream optical signal transports continuous traffic.

8. The bidirectional optical amplifier according to claim 1, wherein the upstream optical signal transports burst traffic.

9. A passive optical network comprising an optical line terminal connected to a plurality of optical network units through a plurality of optical splitters or multiplexers and optical fiber portions, wherein it further comprises a bidirectional optical amplifier according to claim 1.

* * * * *